US012612332B2

(12) United States Patent
Hu et al.

(10) Patent No.: US 12,612,332 B2
(45) Date of Patent: Apr. 28, 2026

(54) IN-SITU HIGH-STRENGTH GRADIENT CARBONIZED MATERIAL AND PREPARATION METHOD THEREOF

(71) Applicant: Wuhan University of Technology, Wuhan (CN)

(72) Inventors: Chuanlin Hu, Wuhan (CN); Xinyu Zhou, Wuhan (CN); Xiong Qian, Wuhan (CN); Fazhou Wang, Wuhan (CN); Yukun Qin, Wuhan (CN); Yedongyang Liu, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 322 days.

(21) Appl. No.: 18/467,066

(22) Filed: Sep. 14, 2023

(65) Prior Publication Data

US 2024/0262744 A1 Aug. 8, 2024

(30) Foreign Application Priority Data

Feb. 6, 2023 (CN) .......................... 202310099844.5

(51) Int. Cl.
| | |
|---|---|
| *C04B 7/34* | (2006.01) |
| *C04B 7/40* | (2006.01) |
| *C04B 24/26* | (2006.01) |
| *C04B 28/10* | (2006.01) |

(Continued)

(52) U.S. Cl.
CPC .................. *C04B 7/34* (2013.01); *C04B 7/40* (2013.01); *C04B 24/2652* (2013.01); *C04B 28/10* (2013.01); *C04B 40/0231* (2013.01); *C04B 2103/32* (2013.01)

(58) Field of Classification Search
CPC ......... C04B 7/34; C04B 7/40; C04B 24/2652;
    C04B 28/10; C04B 40/0231; C04B
    2103/32; C04B 2111/00405; C04B
    20/023; C04B 20/04; C04B 2/10; C04B
    40/0259;

(Continued)

(56) References Cited

U.S. PATENT DOCUMENTS

2020/0055774 A1* 2/2020 Al-Ghouleh .............. C04B 7/48

FOREIGN PATENT DOCUMENTS

| CN | 113620672 A | * 11/2021 | ............. C04B 28/06 |
|---|---|---|---|
| WO | WO-2014140614 A1 | * 9/2014 | ............. C04B 28/10 |

OTHER PUBLICATIONS

CN 113520572AMachine Translation (Year: 2021).*

* cited by examiner

*Primary Examiner* — Pamela H Weiss
(74) *Attorney, Agent, or Firm* — Hemisphere Law, PLLC

(57) ABSTRACT

The invention discloses an in-situ high-strength gradient carbonized material and the preparation method thereof. The in-situ high-strength gradient carbonized material includes a core structure composed of partially calcined calcium carbonate and a shell structure; the shell structure comprises calcium hydroxide and calcium carbonate and covers the outer layer of partially calcined limestone. The invention utilizes an in-situ carbonization reaction to recycle a large amount of low-grade limestone stored or discarded in industry, providing a new technological route for solid waste disposal and resource utilization; this method not only has a green and low-carbon process but also can be widely applied in carbon dioxide capture/collection technology, as well as the preparation of new low-carbon gel materials and concrete.

4 Claims, 3 Drawing Sheets

(51) Int. Cl.
    *C04B 40/02*          (2006.01)
    *C04B 103/32*       (2006.01)

(58) Field of Classification Search
    CPC ........... C04B 2111/00017; C04B 14/28; Y02C
                                       20/40
    See application file for complete search history.

1

IN-SITU HIGH-STRENGTH GRADIENT CARBONIZED MATERIAL AND PREPARATION METHOD THEREOF

FIELD OF THE DISCLOSURE

The disclosure relates to an in-situ high-strength gradient carbonized material and preparation method thereof, which can be used as green building materials.

BACKGROUND

It is crucial to achieve carbon neutrality through carbon control and emission reduction to cope with the intensification of the greenhouse effect. Currently, carbon dioxide capture, utilization, and storage technology is considered an essential technological approach to control carbon emissions and address climate change issues. The existing carbon capture methods mainly focus on key technologies such as low-energy absorbents and capture processes with different technological routes. Among them, commercially available amine absorbents have been developed, but the cost of manufacturing, treating, and regenerating the solvent is too high to meet the needs of the green industry. Using minerals to store carbon dioxide is considered the most stable and safe method, with the potential to store a large amount of $CO_2$. This technology simulates the process of natural minerals absorbing $CO_2$ and accelerates its reaction through specific means, such as using alkaline oxides in natural silicate ore or solid waste to absorb $CO_2$. Specifically, CaO and MgO chemically absorb $CO_2$ and convert it into stable inorganic carbonates. The reaction products obtained by this method are stable and clean. It is a green $CO_2$ storage technology. Limestone is a widely used material in industry, and its product $Ca(OH)_2$ has a high carbonization effect. Therefore, proposing a new method that can capture carbon in situ can significantly improve the utilization of limestone resources and capture, utilize, and store carbon dioxide, thereby alleviating the climate problems caused by the greenhouse effect.

SUMMARY

The present invention discloses an in-situ high-strength gradient carbonized material and the preparation method for solving the prior art's shortcomings.

To achieve the above technical objectives, the following technical solutions are adopted in this application:

In the first aspect, the present invention provides an in-situ high-strength gradient carbonized material comprising a core structure composed of partially calcined calcium carbonate and a shell structure; the shell structure is composed of calcium hydroxide and calcium carbonate and covers the outer layer of partially calcined limestone; the partially calcined calcium carbonate contains 8-60 wt % calcium oxide.

In the second aspect, the present invention provides a preparation method for the in-situ high-strength gradient carbonized material above. The preparation method includes the following steps: crushing and grinding limestone, followed by partial calcination to the sample; adding water and sustained release agent to the sample, stirring evenly, and standing to obtain the mixture; pressing the mixture into a body, and then perform $CO_2$ curing on the body until it reaches the age to obtain the in-situ high-strength gradient carbonized material.

Preferably, the limestone is low-grade with an effective calcium carbonate content of ≥60.00%.

Preferably, the method of partial calcination is as follows: calcining the sample in a rotatable calcination furnace at a speed of 6-10 r/min, at a temperature of 900-1000° C., for a time of 5-30 min, and then rapidly cooling after calcination. Rapidly cooling is to maintain the activity of the material.

Preferably, except for the water required for chemical reactions adjusted according to the calcium oxide content, the mass ratio of the remaining water to the sample is ≤0.20.

Preferably, the sustained release agent is a flocculant or superplasticizer, and the additional amount of the sustained release agent is ≤2.00% by mass of the sample.

Preferably, the flocculant is polyacrylamide.

Preferably, the time of standing is 30-180 min.

Preferably, the pressure for pressing is 1-2 MPa.

Preferably, the conditions for CO2 curing are as follows: CO2 concentration≥60%, CO2 pressure≥0.10 Mpa.

Preferably, the air relative humidity during CO2 curing is ≤30%.

The in-situ high-strength gradient carbonized material is used as a building material for carbon dioxide capture.

The advantages of the present invention are as follows:
(1) This method utilizes an in-situ carbonization reaction to recycle a large amount of low-grade limestone stored or discarded in industry, providing a new technological route for solid waste disposal and resource utilization.
(2) This method has a green and low-carbon process. It can be widely applied in carbon dioxide capture/collection technology and in the preparation of new low-carbon gel materials and concrete.
(3) The heat treatment process is fast, the production process is concise, and the production cost is low.

BRIEF DESCRIPTION OF THE DRAWINGS

Accompanying drawings are for providing further understanding of embodiments of the disclosure. The drawings form a part of the disclosure and illustrate the principle of the embodiments of the disclosure along with the literal description. The drawings in the description below are merely some embodiments of the disclosure; a person skilled in the art can obtain other drawings according to these drawings without creative efforts. In the figures.

DETAILED DESCRIPTION OF PREFERRED EMBODIMENTS

Figures 1, 2:
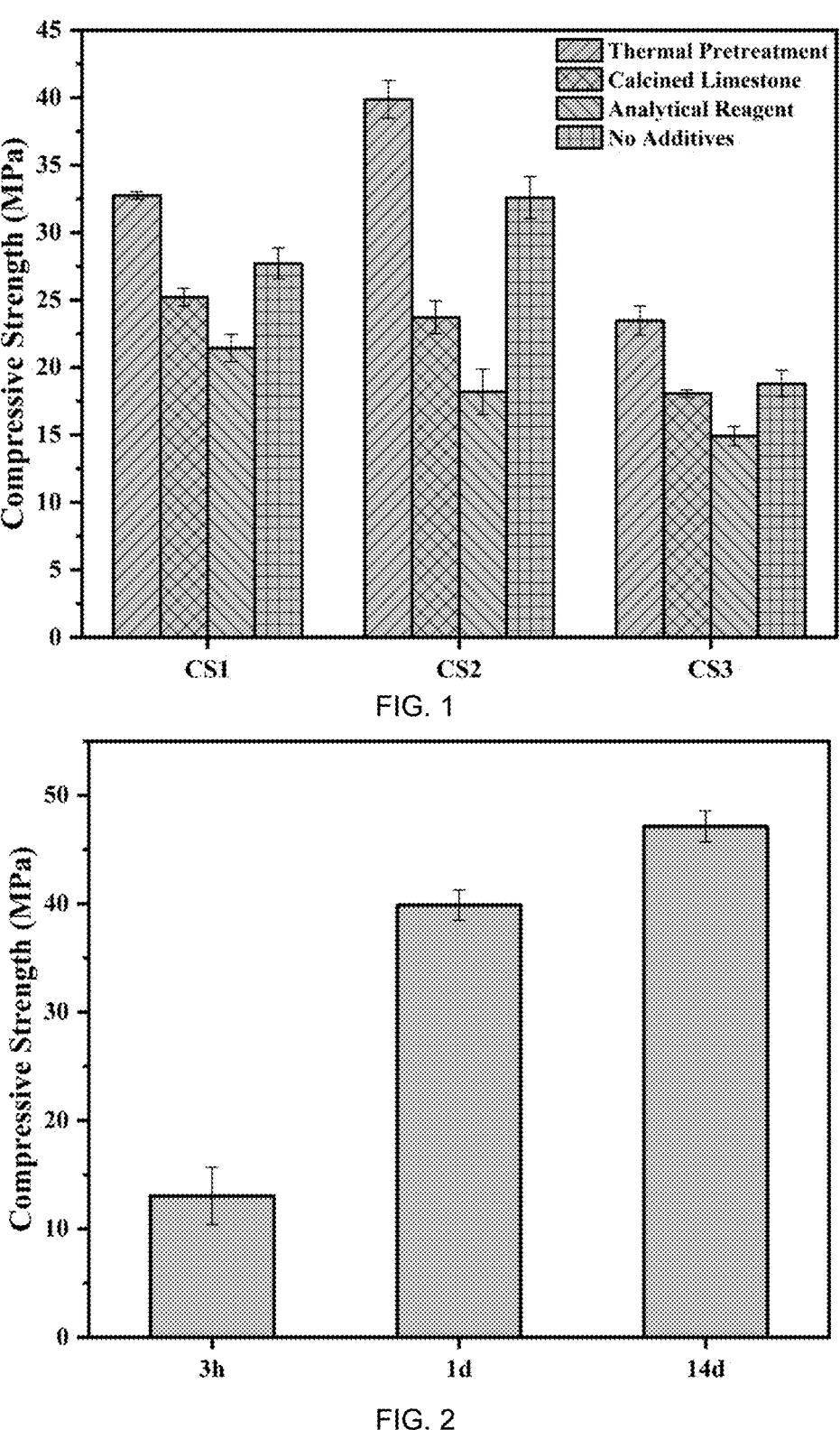
FIG. 1 shows the comparison of compressive strength between Examples 1-3 and Comparative Examples 1-9.
FIG. 2 shows the long-term compressive strength of the target product prepared in Example 2 under carbonization curing.

The flocculant used in the following examples is polyacrylamide, sourced from Hubei Xijian New Materials Co., Ltd., with a solid content of 98%; polycarboxylate superplasticizer is produced by Guizhou Zhiqian Building Materials Co., Ltd., with a solid content of 45%.

The source of limestone powder used in the following examples is waste limestone aggregate, obtained after grinding and crushing, and the effective percentage content of calcium carbonate is 91.96%. The chemical composition of the limestone used in the implementation example was determined by an X-ray fluorescence spectrometer (Zetium, Malvern Panalytics), and the test results are shown in Table 1.

TABLE 1

| chemical composition of the limestone | | | | | | |
|---|---|---|---|---|---|---|
| Loss of ignition, % | $SiO_2$, % | $Al_2O_3$, % | CaO, % | MgO, % | $TiO_2$, % | $Fe_2O_3$, % |
| 42.7 | 2.20 | 0.90 | 51.5 | 2.00 | / | 0.40 |

Example 1

In this example, the preparation method of the in-situ high-strength gradient carbonized material includes the following steps:

Selecting limestone raw materials, crushing and grinding them into powder with a particle size of 200 mesh, and then calcining the powder in a drum calciner at a temperature of 950° C. for 10 min. After calcination, rapidly cooling them to obtain a sample. Taking 20 g of the sample (with a calcium oxide content of 55.6 wt %) after rapidly cooling treatment, adding 7.57 g of water (in which 3.57 g of water is required to react with calcium oxide from $CaO+H_2O \rightarrow Ca(OH)_2$, and the remaining 4 g of water is used for material mixing) and 0.4 g of polycarboxylate superplasticizer. Stirring evenly and standing for 2 h to obtain the mixture. Press the mixture into a body under a pressure of 1.88 MPa, then place the body in a carbonization tank. Curing for 1 day at a $CO_2$ concentration of 80% and a $CO_2$ pressure of 0.2 MPa. The obtained product is recorded as CS1.

The calcium oxide content in the sample after rapid cooling treatment in Example 1 is calculated as follows: 10 g of the sample after rapid cooling is taken and placed in a calciner for overburning (to decompose all calcium carbonate into calcium oxide). Then, its mass is weighed as 8.05 g, which is reacted by $CaCO_3 \rightarrow CaO+CO_2$. Through the loss of 1.95 g of carbon dioxide mass, $(1.95 \text{ g}/44) \times 100 = 4.44$ g of calcium carbonate is decomposed in the sample. Therefore, the calcium oxide content in the sample is 10 g−4.44 g=5.56 g, which is 55.6 wt % of calcium oxide content.

Example 2

In this example, the preparation method of the in-situ high-strength gradient carbonized material includes the following steps:

Selecting limestone raw materials, crushing and grinding them into powder with a particle size of 200 mesh, and then calcining the powder in a drum calciner at a temperature of 950° C. for 10 min. After calcination, rapidly cooling them to obtain a sample. Taking 20 g of the sample (with a calcium oxide content of 34.8 wt %) after rapidly cooling treatment, adding 5.24 g of water (in which 2.24 g of water is required to react with calcium oxide from $CaO+H_2O \rightarrow Ca(OH)_2$, and the remaining 3 g of water is used for material mixing) and 0.2 g of polycarboxylate superplasticizer. Stirring evenly and standing for 2 h to obtain the mixture. Press the mixture into a body under a pressure of 2 MPa, then place the body in a carbonization tank. Curing for 1 day at a $CO_2$ concentration of 80% and a $CO_2$ pressure of 0.2 MPa. The obtained product is recorded as CS2.

Example 3

In this example, the preparation method of the in-situ high-strength gradient carbonized material includes the following steps:

Selecting limestone raw materials, crushing and grinding them into powder with a particle size of 200 mesh, and then calcining the powder in a drum calciner at a temperature of 900° C. for 10 min. After calcination, rapidly cooling them to obtain a sample. Taking 20 g of the sample (with a calcium oxide content of 12.3 wt %) after rapidly cooling treatment, adding 4.19 g of water (in which 0.79 g of water is required to react with calcium oxide from $CaO+H_2O \rightarrow Ca(OH)_2$, and the remaining 3.4 g of water is used for material mixing) and 0.1 g of polycarboxylate superplasticizer. Stirring evenly and standing for 2 h to obtain the mixture. Press the mixture into a body under a pressure of 2 MPa, then place the body in a carbonization tank. Curing for 1 day at a $CO_2$ concentration of 80% and a $CO_2$ pressure of 0.2 MPa. The obtained product is recorded as CS3.

Comparative Example 1

Selecting the calcined limestone powder of the same CaO quality as example 1 (the same limestone raw material source described in Example 1) and analytical reagent calcium carbonate powder of the same $CaCO_3$ quality. Mixing the calcined limestone powder, analytical reagent calcium carbonate powder, and 7.57 g of deionized water, then adding 0.4 g of polycarboxylate superplasticizer and stirring evenly. After standing for 2 h, obtain the mixture. Press the mixture into a body under a pressure of 1.88 MPa, then place the body in a carbonization tank. Curing for 1 day at a $CO_2$ concentration of 80% and a $CO_2$ pressure of 0.2 MPa.

After calculation, the mass of the calcined limestone powder in the comparative example 1 is 20 g×55.6%=1.12 g. The quality of analytical reagent calcium carbonate powder is 20 g−11.12 g=8.88 g. Based on $CaO+H_2O \rightarrow Ca(OH)_2$, 3.57 g of deionized water is required to react with calcium oxide. Based on the water-solid ratio, it can be inferred that an additional 20 g×0.2=4 g of deionized water is required; so, take a total of 7.57 g of deionized water.

Comparative Example 2

Selecting the analytical reagent CaO of the same CaO quality as example 1 and the analytical reagent calcium carbonate powder of the same $CaCO_3$ quality. Mixing 11.12 g of the analytical reagent CaO, 8.88 g of the analytical reagent calcium carbonate powder, and 7.57 g of deionized water, then adding 0.4 g of polycarboxylate superplasticizer and stirring evenly. After standing for 2 h, obtaining the mixture. Press the mixture into a body under a pressure of 1.88 MPa, then place the body in a carbonization tank. Curing for 1 day at a $CO_2$ concentration of 80% and a $CO_2$ pressure of 0.2 MPa.

Comparative Example 3

Except for not adding "0.4 g polycarboxylate superplasticizer", the other steps are the same as Example 1.

Comparative Example 4

Selecting the calcined limestone powder of the same CaO quality as example 2 (the same limestone raw material source as described in Example 2) and analytical reagent calcium carbonate powder of the same $CaCO_3$ quality. Mixing the calcined limestone powder, analytical reagent calcium carbonate powder, and 5.24 g of deionized water, then adding 0.2 g of polycarboxylate superplasticizer and stirring evenly. After standing for 2 h, obtaining the mixture. Press the mixture into a body under a pressure of 2 MPa, then place the body in a carbonization tank. Curing for 1 day at a $CO_2$ concentration of 80% and a $CO_2$ pressure of 0.2 MPa.

After calculation, the mass of the calcined limestone powder in the comparative example 4 is 20 g×34.8%=6.96 g. The quality of analytical reagent calcium carbonate powder is 20 g–6.96 g=13.04 g. Based on $CaO+H_2O\rightarrow Ca(OH)_2$, 2.24 g of deionized water is required to react with calcium oxide. Based on the water-solid ratio, it can be inferred that an additional 20 g×0.15=3 g of deionized water is required; so, take a total of 5.24 g of deionized water.

Comparative Example 5

Selecting the analytical reagent CaO of the same CaO quality as example 2 and analytical reagent calcium carbonate powder of the same $CaCO_3$ quality. Mixing 6.96 g of the analytical reagent CaO, 13.04 g of the analytical reagent calcium carbonate powder, and 5.24 g of deionized water, then adding 0.2 g of polycarboxylate superplasticizer and stirring evenly. After standing for 2 h, obtaining the mixture. Press the mixture into a body under a pressure of 2 MPa, then place the body in a carbonization tank. Curing for 1 day at a $CO_2$ concentration of 80% and a $CO_2$ pressure of 0.2 MPa.

Comparative Example 6

Except for not adding "0.2 g polycarboxylate superplasticizer", the other steps are the same as Example 2.

Comparative Example 7

Selecting the calcined limestone powder of the same CaO quality as example 3 (the same limestone raw material source as described in Example 3) and analytical reagent calcium carbonate powder of the same $CaCO_3$ quality. Mixing the calcined limestone powder, analytical reagent calcium carbonate powder, and 4.19 g of deionized water, then adding 0.1 g of polycarboxylate superplasticizer and stirring evenly. After standing for 2 h, obtaining the mixture. Press the mixture into a body under a pressure of 2 MPa, then place the body in a carbonization tank. Curing for 1 day at a $CO_2$ concentration of 80% and a $CO_2$ pressure of 0.2 MPa.

After calculation, the mass of the calcined limestone powder in the comparative example 7 is 20 g×12.3%=2.46 g. The quality of analytical reagent calcium carbonate powder is 20 g–2.46 g=17.54 g. Based on $CaO+H_2O\rightarrow Ca(OH)_2$, 0.79 g of deionized water is required to react with calcium oxide. Based on the water solid ratio, it can be inferred that an additional 20 g×0.17=3.4 g of deionized water is required; so take a total of 4.19 g of deionized water.

Comparative Example 8

Selecting the analytical reagent CaO of the same CaO quality as example 3 and analytical reagent calcium carbonate powder of the same $CaCO_3$ quality. Mixing 2.46 g of the analytical reagent CaO, 17.54 g of the analytical reagent calcium carbonate powder, and 4.19 g of deionized water, then adding 0.1 g of polycarboxylate superplasticizer and stirring evenly. After standing for 2 h, obtaining the mixture. Press the mixture into a body under a pressure of 2 MPa, then place the body in a carbonization tank. Curing for 1 day at a $CO_2$ concentration of 80% and a $CO_2$ pressure of 0.2 MPa.

Comparative Example 9

Except for not adding "0.1 g polycarboxylate superplasticizer", the other steps are the same as Example 3.

Test and Analysis

FIG. 1 shows a comparison of the compressive strength between Examples 1-3 and Comparative Examples 1-9 (wherein the thermal pretreatment corresponds to Examples 1-3; the calcined limestone corresponds to Comparative Examples 1, 4 and 7; the analytical reagent corresponds to Comparative Example 2, 5 and 8; no additives correspond to Comparative Example 3, 6 and 9). This figure shows their strength development patterns. It can be seen that the thermally pretreated limestone samples after carbonization curing have certain strength advantages at different calcination degrees (referring to different calcium oxide content). Compared with the addition of calcined limestone powder and analytical reagent calcium oxide separately, the strength of the three calcination systems has increased by 30%, 53%, 68%, 119%, 29.9% and 57.4%, indicating that the limestone powder after thermal pretreatment can effectively promote its strength development. In comparison with the absence of additives, it can be seen that additives can effectively improve the strength of the sample. This is because polycarboxylate superplasticizer can adsorb and aggregate dispersed colloidal particles, improving their body's strength; polycarboxylate superplasticizer improves the body's pore structure, allowing for deeper carbonization and higher strength.

FIG. 2 shows the long-term compressive strength of the target product prepared in Example 2 under carbonization curing. It can be seen that the sample has already reached a relatively high level of strength in the early stage, and the strength growth is slow within 1-14 days. The final sample has reached a strength of nearly 50 Mpa, which has good development prospects.

According to the preparation method described in Example 1, the prepared body was cured in the air for 1 day to obtain the target product (denoted as Ref).

Figure 3:
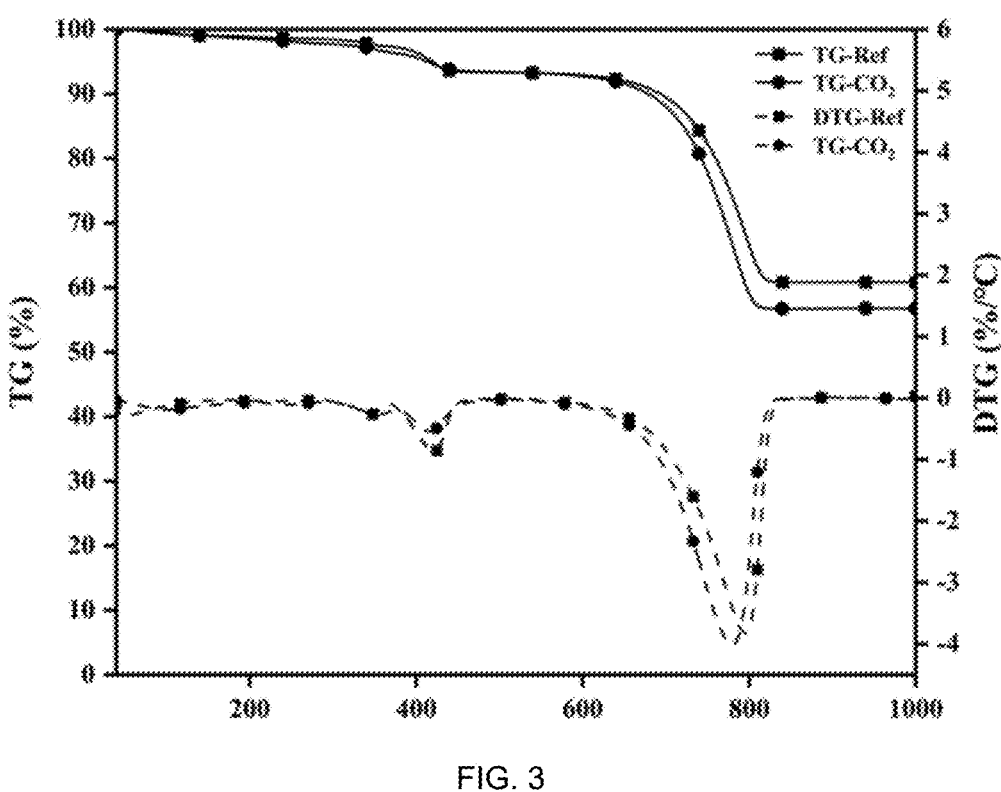
FIG. 3 shows the TG-DTG curves of the target product (corresponding to TG-$CO_2$ and DTG-$CO_2$ in FIG. 3) and Ref prepared in Example 1.

FIG. 3 shows the TG-DTG curves of the target product (corresponding to TG-$CO_2$ and DTG-$CO_2$ in FIG. 3) and Ref prepared in Example 1. From FIG. 3, it can be seen that the weight loss peak between 400° C. and 500° C. corresponds to the decomposition of $Ca(OH)_2$, while the weight loss peak between 600° C. and 800° C. corresponds to the decomposition of calcium carbonate. It can be seen that the weight loss peak of $Ca(OH)_2$ during carbonization curing is more minor, indicating a lower content of $Ca(OH)_2$. So, it indicates that more $Ca(OH)_2$ reacts with $CO_2$ during carbonization curing to generate more calcium carbonate to support the strength of the body.

Figure 4:
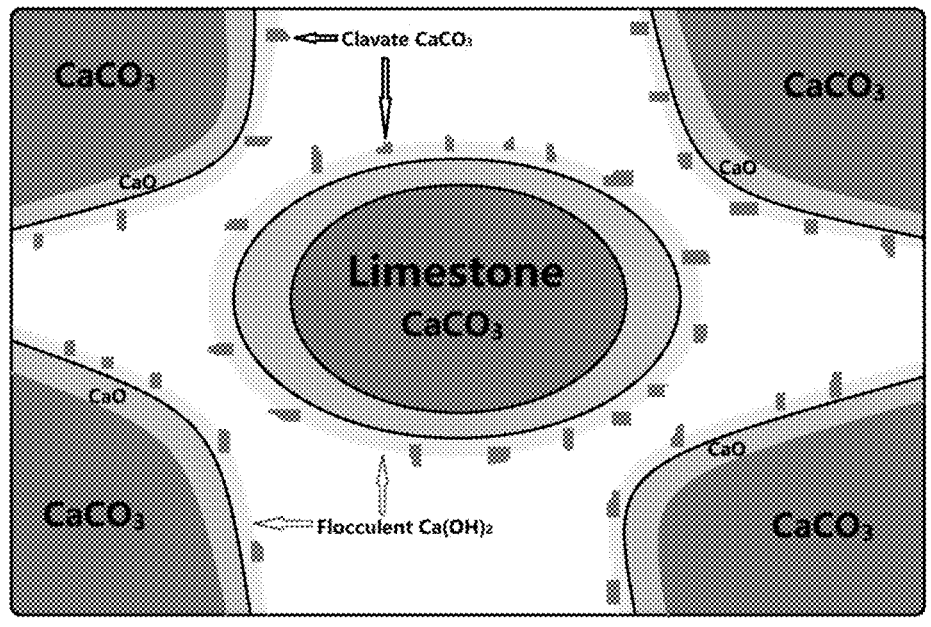
FIG. 4 is a microscopic schematic diagram of the target product prepared in Examples 1-3.

FIG. 4 is a microscopic schematic diagram of the target product prepared in Examples 1-3. The figure shows that the dark gray part is calcium carbonate that has not been calcined after thermal pretreatment. In contrast, the light gray part in the secondary layer is a portion of calcium carbonate calcined and decomposed into calcium oxide. The outermost layer is based on the reaction of calcium oxide on limestone with water and carbon dioxide to generate flocculent $Ca(OH)_2$ and calcium carbonate with needle bar structure. It can be seen that the prepared carbonized material exhibits gradient changes from the inside out, specifically, $CaCO_3/CaO/Ca(OH)_2/CaCO_3$. Due to the reaction and growth of calcium oxide on limestone, the subsequent reactants are all based on limestone. Hence, the connections between these products are very tight, resulting in higher macroscopic strength.

Figure 5:
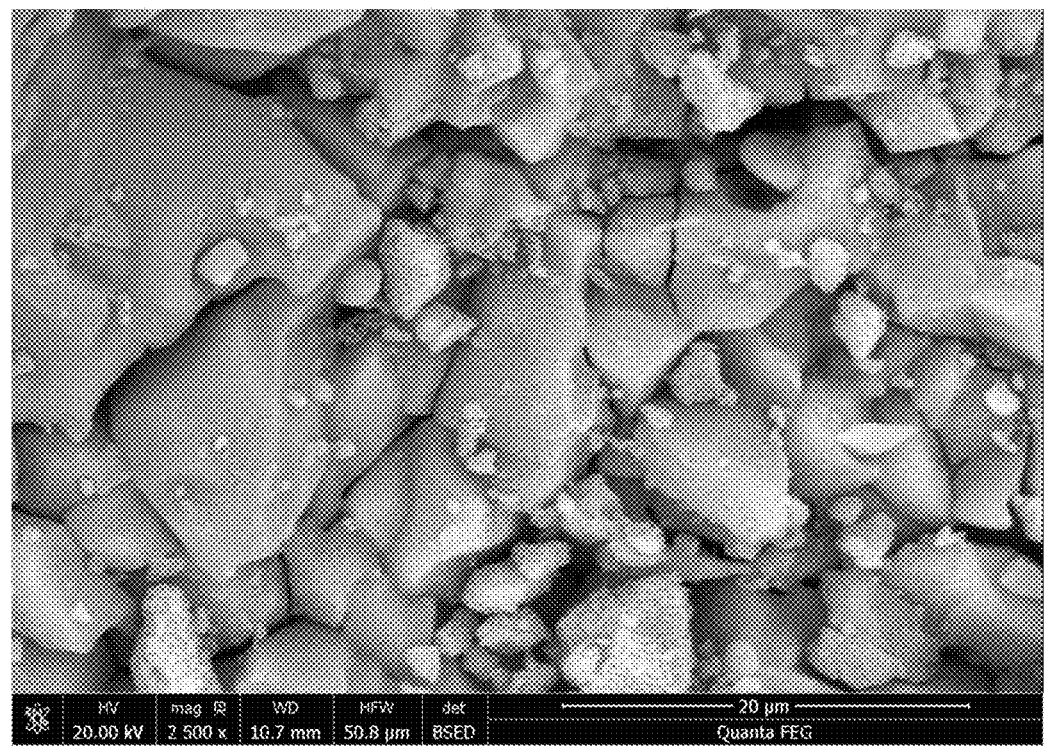
FIG. 5 is an SEM image of the target product prepared in Example 2.

FIG. 5 is an SEM image of the target product prepared in Example 2. This figure shows that the distribution of small and granular calcium oxide on the surface of limestone is disorderly and numerous. It is precisely because of this large specific surface area of calcium oxide that its structure is very dense and has high carbonization activity.

The above descriptions are only preferred embodiments of the present invention and are not intended to limit the present invention. Any modification, equivalent replacement, improvement, etc., made within the spirit and principle of the present invention shall be included in the protection of the present invention.

What is claimed is:

1. A preparation method of in-situ high-strength gradient carbonized material, including the following steps:

crushing and grinding limestone, followed by partial calcination to a sample wherein partial calcination comprises calcining the sample in a rotatable calcination furnace at a speed of 6-10 r/min at a temperature of 900-1000° C., for a time of 5-30 min. and then rapidly cooling after calcination adding water and a sustained release agent to the sample, stirring evenly, and standing for 30-180 min to obtain a mixture;

pressing the mixture into a body at a pressure of 1-2 MPa, and then perform $CO_2$ curing on the body until it reaches the age to obtain the in-situ high-strength gradient carbonized material wherein the $CO_2$ curing conditions comprise a $CO_2$ concentration≥60%, $CO_2$ pressure≥0.10 MPa; the air relative humidity during $CO_2$ curing is ≤30%.

2. The preparation method of in-situ high-strength gradient carbonized material according to claim 1, wherein the limestone is low-grade limestone with an effective calcium carbonate content of ≥60.00%.

3. The preparation method of in-situ high-strength gradient carbonized material according to claim 1, wherein the sustained release agent is a flocculant or superplasticizer, and the addition amount of the sustained release agent is ≤2.00% by mass of the sample.

4. The preparation method of in-situ high-strength gradient carbonized material according to claim 2, wherein the flocculant is polyacrylamide.

* * * * *